Patented Jan. 30, 1945

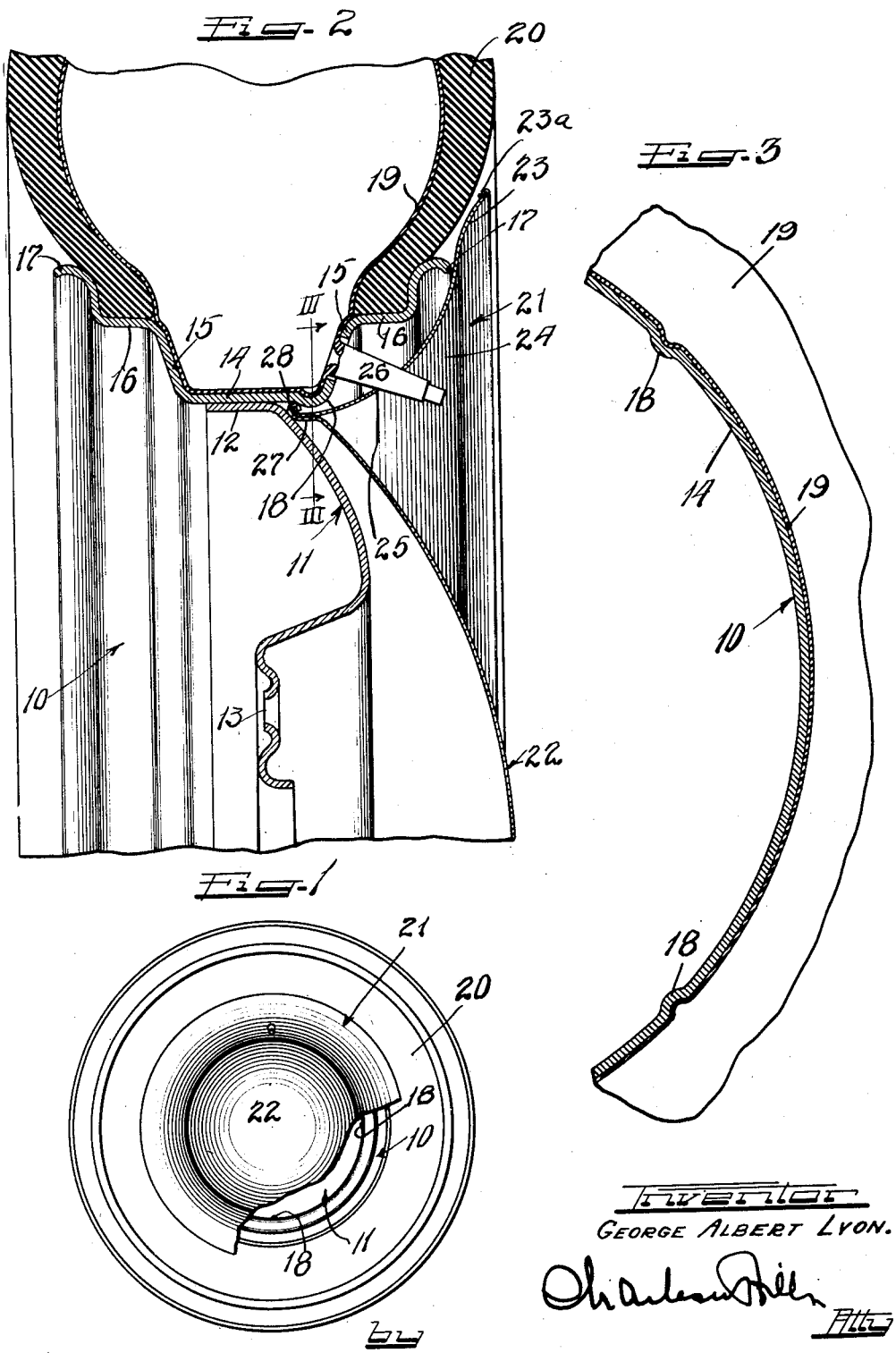

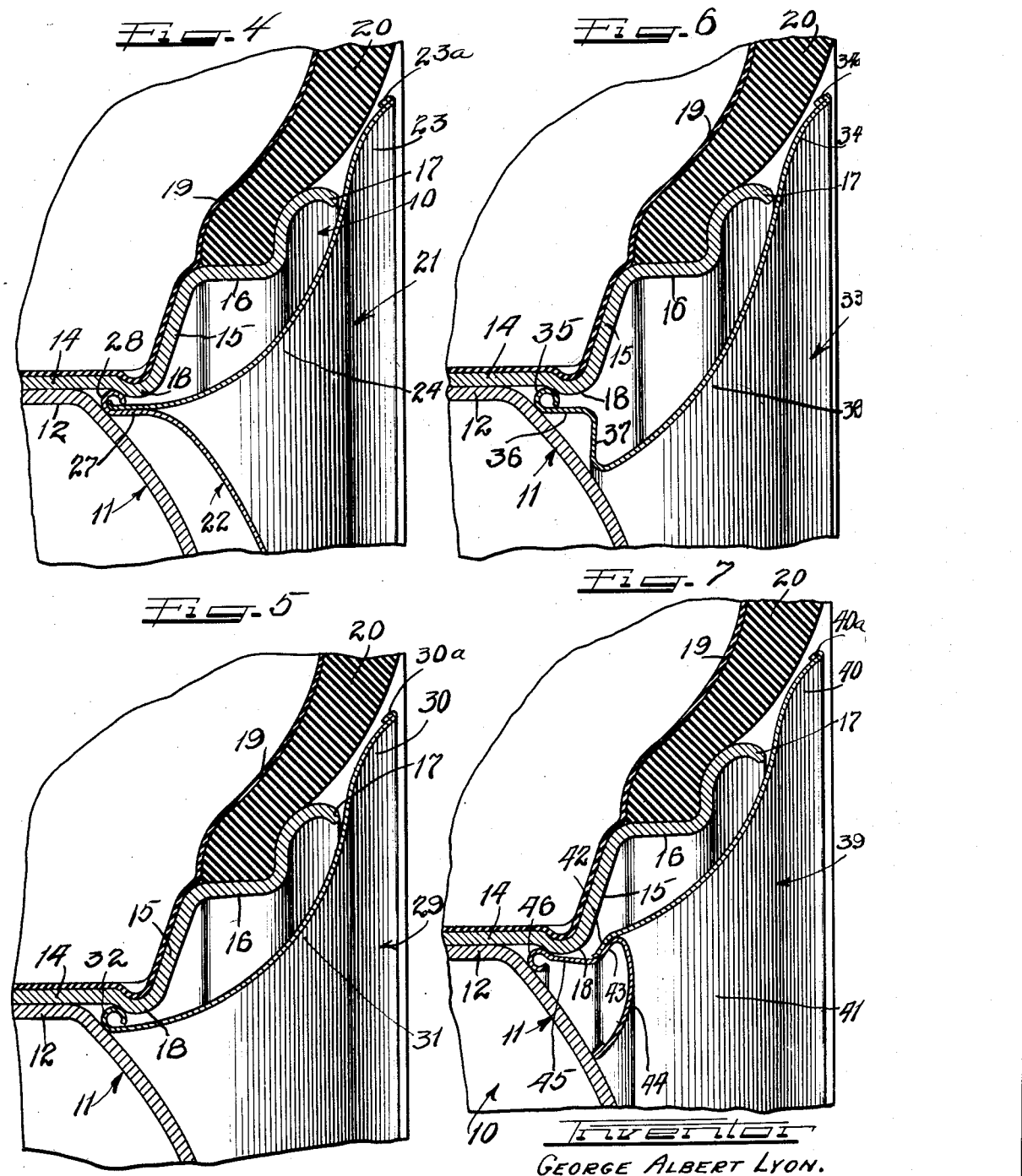

2,368,249

UNITED STATES PATENT OFFICE 2,368,249

WHEEL STRUCTURE

George Albert Lyon, Allenhurst, N. J.

Application July 22, 1943, Serial No. 495,676

6 Claims. (Cl. 301—37)

This invention relates to an improved wheel structure and is directed more particularly to improved means for retaining a cover assembly over the outer side thereof.

It is an important object of the invention to provide an improved wheel structure in which there is provided improved means for retaining a cover over the outer surface thereof and which, at the same time, aids in the cooperative association of the tire assembly with the wheel.

It is still another object of the invention to provide for a wheel structure, improved means for retaining a cover over the outer side thereof, said means being formed as an inherent part of the wheel and thus obviating the necessity of auxiliary clips or the like.

Still another object of the invention is to provide for a wheel structure, a cover member which is arranged to extend over the outer side of the tire rim of the wheel to conceal the same, said cover member having a cross-sectional configuration of such curvature as to substantially simulate the curvature of the side wall of a tire in the wheel structure and to give the appearance of being a part thereof, thereby to give the effect of a massive tire mounted upon a wheel structure of minimum dimension, said cover being constructed from a synthetic plastic material having physical characteristics enabling it to be form-retaining and self-sustaining and yet being resiliently, temporarily deflectable whereby it will assume its initial position once the deflecting forces have been released therefrom.

Still another object of the invention is to provide for a wheel structure a cover member formed form a synthetic plastic material having physical characteristics enabling it to be form-retaining and self-sustaining and yet resiliently, temporarily deflectable, said cover member being provided at a peripheral margin thereof with a bead arranged to engage a protuberance on one portion of the wheel and arranged to bear against another portion of the wheel, whereby the bead is clampingly engaged between the wheel portions in non-rattle, non-vibratory relationship.

It is a further object of the invention to provide on a wheel structure including a tire rim and a central load bearing portion, improved retaining means for retainingly, detachably engaging a cover member, said retaining means including protuberances arranged to extend radially inwardly of the tire rim portion, and in the vicinity of the central load bearing portion whereby a part of a cover assembly associated with the protuberances will rest upon the adjacent portion of the axially outer surface of the central load bearing portion.

In accordance with the general features of my invention there is provided in one embodiment thereof a wheel structure including a tire rim and a central load bearing portion, said rim having protuberances formed in the base flange thereof to extend radially inwardly of the wheel structure in the vicinity of the central load bearing portion and a cover assembly including an outer annular ring formed from synthetic plastic material having characteristics enabling it to be self-sustaining and form-retaining and yet resiliently, temporarily deflectable upon the application of pressure thereto, said cover member having associated therewith means affording a bead for retainingly engaging the respective protuberances and the adjacent portion of the central load bearing part of the wheel.

In accordance with other general features of the invention, as shown in other embodiments thereof, the cover member is formed at the inner peripheral edge thereof to provide a bead for cooperating with the retaining means on the tire rim and with the adjacent portion of the outer surface of the central load bearing portion of the wheel.

Other objects and advantages of the invention will become apparent from the following description and accompanying drawings in which:

Figure 1 is a side elevation of a wheel structure with parts broken away, embodying one form of my invention;

Figure 2 is a fragmentary radially cross-sectional view of the construction shown in Figure 1;

Figure 3 is a fragmentary enlarged cross-sectional view taken along the line III—III of Figure 2;

Figure 4 is a fragmentary enlarged cross-sectional view of a portion of the wheel of Figure 1;

Figure 5 is a fragmentary cross-sectional view of a wheel structure showing a modified form of my invention;

Figure 6 is a fragmentary cross-sectional view of a still further modified form of my invention; and Figure 7 is a fragmentary cross-sectional view of a further modified form of my invention.

It will be understood that the embodiments shown herein are for illustrative purposes and may be changed or modified without departing from the spirit and scope of the invention as set forth in the appended claims.

In the structure shown in Figures 1, 2, 3 and 4, the wheel includes a drop center type tire rim 10 and a central load bearing portion or spider part 11 having at the radially outer part thereof an axially inwardly extending skirt 12 and also having at the radially inner margin thereof a bolt-on flange 13 defining a central orifice for receiving the axle of a vehicle with which the wheel is associated.

The tire rim 10 includes a base flange 14, opposite side wall flanges 15, intermediate flanges 16 and edge portions 17. The radially inner surface of the base flange 14 is adapted to be secured by welding or riveting, or the like, to the flange 12 of the central body part whereby a unitary wheel structure is obtained.

To the end that a wheel cover may be detachably retained on the outer side of the wheel structure in a manner to be described presently, the base flange 14 of the tire rim 10 is provided, at substantially the junction thereof with the axially outwardly disposed intermediate side wall 15, with protuberances 18. These protuberances are circumferentially spaced around the wheel structure and are formed by indenting the inner side of the base flange 14 thereby to provide an indentation at the radially outer surface thereof. With such a construction, it will be seen that upon inflation of the inner tube 19 of the tire 20, the portions thereof coinciding with the indentations afforded by the protruding bosses 18, will bind against the irregular radially outer surface so formed in the tire rim to effectively lock the tire against circumferential slippage during operation of the wheel.

In the construction of Figures 1, 2, 3 and 4, the cover assembly includes a radially outer annular portion 21 and a central circular hub cap simulating portion 22. These cover members are preferably formed from a synthetic plastic material having characteristics enabling the cover to be form-retaining and self-sustaining and yet resiliently, temporarily flexible out of the configuration shown, whereby the members will resume their initial configuration immediately upon the release of distorting pressures therefrom.

The outer annular cover member 21 is preferably formed with a cross-sectional expanse of such magnitude that the radially outer portion 23 thereof hugs the side wall of the tire 20 and merges with an intermediate curvate portion 24 which is provided with a cross-sectional curvate configuration whereby it substantially simulates the side wall of the tire 20. This portion 24 is provided with a suitable orifice 25 adapted to receive therethrough the valve stem 26 of the inner tube 19. The central hub cap simulating member 22 may likewise be constructed from a synthetic plastic material having the above mentioned characteristics and is provided at the radially outer margin thereof with an axially inwardly extending flange 27 terminating in a curled bead 28 which is arranged to encompass the radially inner peripheral margin of the cover member 21, thus to provide an interlocking joint between the same to afford a multi-part cover assembly in which the parts may be attached to and detached from the wheel structure in a manner to be presently described, as a single unit.

In assembling the cover upon the wheel structure in the position shown in Figure 2, it will be seen that it is merely necessary to align the cover assembly concentrically with the wheel structure and then to urge the same axially inwardly whereupon the protuberances 18 are overridden by the bead 28 until the latter passes axially inwardly of the protuberance and into a position of abutment with the adjacent portion of the outer surface of the central load bearing portion 11. With such an arrangement, it will be seen that the junction formed between the cover members 21 and 22 is nested wedgingly between the tire rim 10 and the central load bearing portion 11 and that this nested relationship is facilitated by the compressive action of the parts of the wheel upon the bead 28. Furthermore, since the cover assembly is constructed from a synthetic plastic or the like, a non-metallic engagement is made between the wheel and the cover, whereby vibration and rattling is avoided.

In the construction of Figure 5, the cover and wheel construction is similar to that of Figures 1, 2, 3 and 4. In this embodiment, however, the cover member 29 is maintained upon the wheel structure in detachable engagement therewith solely by its own configuration and without the aid of a central hub cap simulating member. In this construction, the cover 29 is provided with an outer peripheral part 30, reinforced by a turned back flange 30a, as is the case in the construction of Figure 4, the portion 30 extending radially outwardly of the tire rim 10 to overlie the outer side wall of the tire 20. The cover member 29 is further provided with an intermediate portion 31 which is configurated to substantially simulate the curvature of the outer side wall of the tire 20 thereby to give the appearance of being a continuation thereof and to give the appearance of being the white side wall of a massive tire mounted upon a wheel structure of minimum dimension. The radially inner peripheral margin of this cover member 29 is provided with a bead 32 which terminates a substantially axially inwardly extending adjacent marginal portion, this bead being arranged to be urged axially inwardly and pressed over the protuberances 18 as explained in connection with the construction of Figure 4. Here again the cover 29 being non-metallic, the bead is resiliently, wedgingly engaged between the protuberance 18 and the adjacent portion of the outer surface of the central load bearing portion 11 to afford a non-rattling, non-vibrating connection.

In the construction shown in Figure 6, the cover member 33 is provided with a radially outer marginal portion 34 having a turned back reinforcing flange 34a, this radially outer portion extending radially outwardly beyond the edge portion 17 of the tire rim to likewise overlap the side wall of the tire 20 to conceal the junction between the tire and edge portion 17 of the tire rim. In this construction, the cover member 33 is likewise provided with a snap-on bead 35 at the radially inner marginal portion thereof, this bead terminating an axially inwardly extending flange 36 which is adjacent a substantially radially inwardly extending flange portion 37. This flange portion 37 is connected with the body portion of the cover 33 and particularly with the curvate intermediate part 38 thereof which is arranged to simulate the side wall of the tire 20 to give the appearance of being a continuation thereof. It will be seen that the provision of the intermediate flange 37 allows the cover member 33 to be provided with a greater radial depth whereby the appearance of a tire of increased size, without necessitating the actual manufacture of such a tire, is augmented.

In the construction of Figure 7, the annular tire member 39 is formed from synthetic plastic material having physical characteristics enabling it to be self-sustaining and form-retaining, yet resiliently, temporarily deflectable to return to its initial position upon release of the deforming or deflecting pressure therefrom.

In this construction also, the cover is provided with a radially outwardly extending marginal portion which extends radially outwardly beyond the edge portion 17 of the tire rim and an intermediate concave-convex portion 41 arranged to substantially simulate the curvature of the side wall of the tire to give the appearance of being a part thereof, the intermediate portion 41 terminating in an inner peripheral flange 42. This flange 42 is arranged to bear against an intermediate flange 43 on an annular preferably metallic trim member which includes an ornamental, axially outwardly exposed portion 44. This trim member is provided with a substantially axially inwardly extending flange 45 terminating axially inwardly in a bead 46 which is also adapted to be urged axially inwardly behind the humps or protuberances 18 and into engagement with the adjacent part of the outer surface of the central load bearing portion 11 to provide wedging retaining engagement between the cover assembly and the wheel structure. Preferably the annular trim member is constructed from a highly lustrous material such as stainless steel so that the portion 44 thereof serves as a rigidifying ornamental border for the inner peripheral margin of the cover member 39.

What I claim is:

1. In a wheel structure having a tire rim part and a central load bearing part, the tire rim part being of the drop center type and having a base flange and said central load bearing part having a radially outer marginal portion secured to said base flange to afford a unitary wheel structure, protuberances formed in the axially outer part of said base flange for providing radially outwardly facing indentations in the radially outer surface thereof and spaced, radially inwardly extending bumps, a cover assembly for disposition over the outer side of the wheel structure, said assembly including a substantially axially inwardly extending retaining bead arranged for snap-on engagement with said protuberances, said bead being adapted to have an axially outer part thereof rest against the axially inner surface of said protuberances with the axially inner part thereof urged into abutment with the adjacent portion of the central load bearing portion.

2. In a wheel structure including a central part and a drop center multi-flange tire rim with a tire and a tube therein, the base flange of the rim having a plurality of circularly spaced depressions therein in which portions of the tube project to aid in limiting circumferential slipping thereof, said depressions providing radially inwardly projecting protuberances adjacent an outer side flange of the rim for retaining a wheel trim comprising an annular ring and a central circular hub cap portion, said ring and hub cap portions having the radially inner and radially outer parts respectively associated in a lock seam junction comprising an axially inwardly extending snap-on bead arranged for snap-on engagement behind the protuberances upon axially inward movement thereof relative to the wheel, said bead also being arranged to engage the adjacent portion of the outer surface of the wheel structure to be wedged thereagainst by engagement with said protuberances.

3. In a wheel structure having a multi-flange drop center type tire rim and a central load bearing portion, there being a plurality of circularly spaced depressions in the axially outer part of the base flange of said tire rim, said depressions forming indentations into which a tire tube may fit when associated with the wheel structure and forming radially inwardly extending protuberances for receiving a snap-on portion of a circular wheel cover arranged for disposition over the outer side of the wheel structure, and a circular wheel cover arranged for disposition over the outer side of the surface of the tire rim, said wheel cover being constructed from a synthetic plastic material and having physical characteristics to render it self-sustaining and form retaining and yet deflectable temporarily without permanent distortion thereof, said cover member having a cross-sectional curvature of such configuration as to simulate the curvature of the side wall of a tire therein to give the appearance of being a part of a tire, the inner marginal portion of said cover being formed with a snap-on bead arranged for detachable engagement behind said protuberances, said bead terminating a substantially axially extending flange which in turn constitutes the radially outer terminal of a substantially radially inwardly extending intermediate flange, the radially inner edge of said flange being disposed radially inwardly of the radially inward extremity of the tire rim and being joined with the radially inner extremity of the axially outwardly exposed expanse of said cover.

4. In a wheel structure having a multi-flange drop center type tire rim and a central load bearing portion, there being a plurality of circularly spaced depressions in the axially outer part of the base flange of said tire rim, said depressions forming indentations into which a tire tube may fit when associated with the wheel structure and forming radially inwardly extending protuberances for receiving a snap-on portion of a circular wheel cover arranged for disposition over the outer side of the wheel structure, and a cover assembly including an annular trim member arranged for disposition over the outer side of the exposed surface of the tire rim, said trim member being constructed from a synthetic plastic material and having physical characteristics rendering it self-sustaining and form retaining and yet resiliently, temporarily deflectable without permanent distortion, said cover member also having a cross-sectional curvature of such configuration that it simulates the cross-sectional curvature of the side wall of a tire in the tire rim to give the appearance of being a part thereof, and an ornamental retaining annulus for securing said trim member to the wheel structure, said annulus including an axially inwardly extending snap-on bead arranged for disposition behind said protuberances, said retaining annulus also including an annular portion formed into a substantially radially outwardly extending flange for receiving the radially inner marginal portion of the trim member, said last named flange terminating in an axially outwardly exposed ornamental expanse arranged to extend radially of the wheel structure.

5. In a cover assembly for the outer side of a wheel structure including a tire rim having a base flange and a central load bearing portion, the base flange of the rim having a plurality of spaced indentations therein for affording radially outwardly opening tire receiving depressions and radially inwardly extending cover receiving protuberances, a circular, frangible plastic cover member and a central cover member disposed in concentric relationship therewith, said cover members having adjacent margins thereof joined together, said joint being adapted to engage behind said protuberances on the wheel in snap-on, pry-off relationship.

6. In a cover assembly for the outer side of a wheel structure including a tire rim, a plurality of spaced protuberances extending outwardly from the wheel on the outer side thereof, a circular, frangible plastic cover member and a circular central cover member disposed in concentric relationship therewith and connected thereto for detachably engaging behind said protuberances on the wheel in snap-on, pry-off relationship and the connection between said members comprising means on said central cover member for retainingly receiving the adjacent marginal part of said frangible cover member whereby both of said cover members are maintained upon the wheel structure in detachable, snap-on, pry-off relationship thereto as a unitary structure.

GEORGE ALBERT LYON.